United States Patent
Pepper et al.

(10) Patent No.: US 7,119,906 B2
(45) Date of Patent: Oct. 10, 2006

(54) OPTICAL REMOTE SENSOR WITH DIFFERENTIAL DOPPLER MOTION COMPENSATION

(75) Inventors: David M. Pepper, Malibu, CA (US); Monica Minden, Monte Nido, CA (US); Gilmore J. Dunning, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 268 days.

(21) Appl. No.: 10/789,260

(22) Filed: Feb. 26, 2004

(65) Prior Publication Data

US 2005/0190373 A1    Sep. 1, 2005

(51) Int. Cl.
*G01B 9/02* (2006.01)

(52) U.S. Cl. .................................... 356/484
(58) Field of Classification Search ............... 356/28.5, 356/450, 484, 485, 486; 250/559.19, 559.21
See application file for complete search history.

(56) References Cited

U.S. PATENT DOCUMENTS

| | | | |
|---|---|---|---|
| 5,229,832 A | 7/1993 | Gaynor | 356/360 |
| 5,585,921 A | 12/1996 | Pepper et al. | 356/357 |
| 5,684,588 A * | 11/1997 | Khoury et al. | 356/458 |
| 6,532,061 B1 * | 3/2003 | Ortyn et al. | 356/28 |
| 6,657,732 B1 | 12/2003 | Pepper et al. | 356/502 |

OTHER PUBLICATIONS

Feinberg, J., "Continuous-Wave Self-Pumped Phase Conjugator With Wide Field of View," *Optics Letters*, vol. 8, No. 9, pp. 480-482 (1983).
Feinburg, J., et al., "Phase-Conjugating Mirror With Continuous-Wave Gain," *Optics Letters*, vol. 5, No. 12, pp. 519-521 (Dec. 1980); ibid, (Errata), vol. 6, No. 5, p. 257 (May 1981).
Feinburg, J., "self-Pumped, Continuous-Wave Phase Conjugator Using Internal Reflection," *Optics Letters*, vol. 7, No. 10, pp. 486-488 (Oct. 1982).
Matsuda, Y., et al., "Optical Detection of Transient Lamb Waves on Rough Surfaces By a Phase-Conjugate Method," *Jpn. J. Appl. Physics*, vol. 31, pp. L 987-L 989 (Jul. 15, 1992).
Paul, M., et al, "Interferometric Detection of Ultrasound At Rough Sufaces Using Optical Phase Conjugation," *Applied Physics Letters*, vol. 50, No. 22, pp. 1569-1571 (Jun. 1, 1987).

* cited by examiner

Primary Examiner—Gregory J. Toatley, Jr.
Assistant Examiner—Michael A. Lyons
(74) Attorney, Agent, or Firm—Ladas & Parry LLP

(57) ABSTRACT

A system and a method for remotely sensing global motion of an ensemble of dynamically moving scattering sites. The system comprising a scattering medium under inspection, an optical transceiver and a detector in a double-pass geometry.

24 Claims, 4 Drawing Sheets

OPTICAL REMOTE SENSOR WITH DIFFERENTIAL DOPPLER MOTION COMPENSATION

CROSS REFERENCE TO RELATED APPLICATION

This application is relates to U.S. patent application Ser. No. 09/849,641 filed May 4, 2001, entitled "Vibrometer System Using a Phase Conjugate Mirror" this disclosure of which is hereby incorporated herein by reference.

TECHNOLOGICAL FIELD

The technology disclosed herein relates to a system for and method of sensing net global motion of components in an ensemble of dynamically moving scattering sites. This technology is useful for remote sensing and reconnaissance data acquisition applications in various scattering systems, including ocean water, fog, clouds, suspensions, biological samples, as well as liquid and gaseous flow monitoring systems.

BACKGROUND INFORMATION

The attempt to determine the net global motion of components in an ensemble of dynamically moving scattering sites has proved to be complex, given that many ensembles of scattering sites possess two modes of motion: a global velocity component and a differential velocity component. It is the presence of the random motion that adds noise to the system and inhibits the optimum performance of the sensor. By suppressing this noise in an optical manner, less of the system's dynamic range need be sacrificed. Therefore, optimal use of the dynamic range of the detection apparatus and/or post-processing can be realized, thus the sensor performance is highly optimized.

In general, major concerns of such remote sensors include overall system efficiency, maintaining optical interrogation probe beams on the scattering sites under dynamic conditions, minimizing undesirable scattering, which can either corrupt the measurement or reveal the probing operation to an undesirable third part, and avoiding optical damage of the medium undergoing interrogation due to system inefficiency.

Currently, the prior art that exists in remote sensors involves complex adaptive optical compensation systems and light detection and ranging (lidar) approaches. These approaches require intensive post processing which makes them unattractive in many applications.

A conventional laser-ultrasonic non-destructive inspection system is taught Pepper et al. in U.S. Pat. No. 5,585,921 which issued on Dec. 17, 1996.

There are two system bandwidth parameters that characterize the performance of a sensing system: the detection bandwidth, also known as the coherent bandwidth, defined as the maximum global motion, or Doppler shift, that can be detected by the system, and the noise reduction bandwidth, also known as the incoherent bandwidth, defined as the maximum differential Doppler shift that can be suppressed by the system.

BRIEF DESCRIPTION

Briefly and in general terms, the presently disclosed technology relates to an optical system for sensing net global motion components in an ensemble of dynamically moving scattering sites which has a laser probe source; a scattering medium under inspection, which is illuminated by the laser probe source; a wavefront-reversal device for collecting light reflected from the scattering medium and returning a conjugated beam; and an optical detector for detecting and processing the conjugated beam reflected from the scattering medium.

In another aspect, the presently disclosed technology relates to an optical system for suppressing noise components produced by an ensemble of dynamically moving scattering sites which has a laser probe source; a scattering medium under inspection, which is illuminated by the laser probe source; a wavefront-reversal device for collecting light reflected from the scattering medium and returning a conjugated beam; and an optical detector for detecting and processing the conjugated beam reflected from the scattering medium.

In yet another aspect, the presently disclosed technology relates to a remote sensor comprising a laser probe source; a scattering medium under inspection, which is illuminated by the laser probe source; a wavefront-reversal device for collecting light reflected from the scattering medium and returning a conjugated beam; and an optical detector for detecting and processing the conjugated beam reflected from the scattering medium.

In yet another aspect, the presently disclosed technology relates to method for sensing net global motion components in an ensemble of dynamically moving scattering sites. A laser probe source is provided that illuminates a scattering medium under inspection. A wavefront-reversal device is provided that collects light reflected from the scattering medium and returns a conjugated beam. A detector is provided that detects and processes the reflection of the conjugated beam from the scattering medium.

DETAILED DESCRIPTION

Figure 1A:
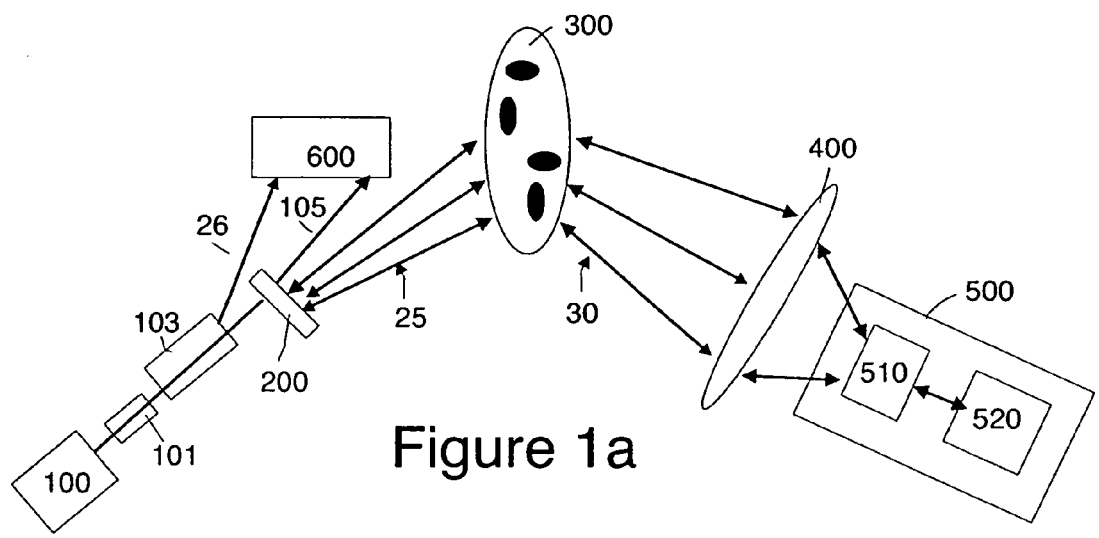
FIG. 1a is a schematic of the basic system components of one embodiment: a laser probe, the scattering medium, wavefront-reversal module (a self-pumped phase-conjugate mirror), and a heterodyne detector/processor.

FIG. 1a is a schematic diagram of the basic system architecture of one embodiment of the presently disclosed technology, utilizing a self-pumped Phase Conjugate Mirror (PCM) in a wavefront-reversal module 500 and a heterodyne detector 600. A laser beam from a probe laser 100, which laser may be implemented by a diode-pumped solid state laser, an argon ion laser, a laser diode or other lasing device, is preferably passed via an optical isolater 101 to an Acousto-Optic (AO) modulator 103. The optical isolater 101 is preferably utilized to prevent reflected beams from re-entering the probe laser 100 which could otherwise cause instability in the probe laser 100. The AO modulator 103 generates a local oscillator (LO) reference signal 26 that is offset in frequency from the signal beam for heterodyne detection of a received signal 105 by a heterodyne detector 600. As will be seen, the received signal 105 reflects off the surface of beam splitter 200 in this embodiment. Those skilled in the art will appreciate that beam 26 and beam 105 would typically enter the heterodyne detector 600 superimposed upon each other so that they co-propagate and are co-polarized, but are shown separated in the figures for ease of illustration and understanding. Thus, additional beam splitters, mirrors and other optical devices would typically be used to superimpose those signal, but since the use of heterodyne detectors 600 in combination with AO modulators 103 is well known in the art, the particular techniques to superimpose the two beams 26, 105 need not be discussed here.

The frequency shifted beam 26, which may be shifted 10–80 MHz depending upon the desired bandwidth, that defracts from the AO modulator 103 is used as a Local Oscillator (LO) reference beam for the heterodyne detector 600. The undifracted part, which is in general of greater amplitude, serves as the probe beam 25 that, after passing through a beam splitter 200, propagates through the ensemble of dynamically moving scattering sites 300, also referred to herein as a scattering medium. The scattering medium 300 may take the form of a collodial suspension of particles in a aqueous medium, e.g., biological species in ocean water, or levitated particles in an atmosphere. The propagation of beam 25 through the scattering medium may well result in the beam becoming diffused. Lens 400 collects the diffused beam 30 and directs it to illuminate a wavefront-reversal module 500. The collected beam preferably propagates through an optional amplifier 510 that may be optionally used in both the self-pumped PCM as well as the externally-pumped PCM embodiments. The amplifier 510 may comprise a Er:Fiber, a two wave mixer, a raman amplifier, etc. The optionally amplified beam illuminates a phase conjugator 520.

The wavefront-reversal module 500 can be in the form of self-referencing device or an externally pumped device. Examples of self-referencing devices include self-pumped phase-conjugate mirrors 520 and adaptive optical elements such as spatial light modulators 720 shown in FIGS. 3a and 3b. Examples of externally pumped devices include externally phase-conjugate mirrors 520' shown in FIGS. 2a and 2b and other real-time holographic devices. A preferred embodiment is the self-pumped phase-conjugate mirror 520 shown in FIG. 1a. The self-pumped device can preferably accommodate the case where the frequency domains of the signal and noise overlap, where the externally pumped device is more constrained and may be used in cases where the noise is within the compensation bandwidth of the device, while the signal bandwidth is beyond the bandwidth of the device.

The detection bandwidth is dictated by the Bragg condition of the phase-conjugate mirror 520, as well as the wavelength-dependent spatial resolution of the system. These effects conservatively result in a bandwidth exceeding 10 GHz. This value corresponds to a maximum detectable globally induced Doppler speed by the scattering medium of 5 km/sec at an optical wavelength of 0.5 micrometers. On the other hand, the noise compensation bandwidth of this scheme is limited by the grating formation time within the phase-conjugate mirror 520. In the case of a GaAs Multiple Quantum Well (MQW), the compensation bandwidth can approach 1 MHz, which corresponds to a maximum differential Doppler speed compensation capability of 0.5 m/sec within the scattering medium at an optical wavelength of 0.5 micrometers (on the other hand, a barium titanate device, which can approach a 1 kHz bandwidth, can compensate for Doppler speeds in the range of 0.5 mm/sec). By using a membrane spatial light modulator as a wavefront-reversal device, the real-time holographic response times can approach 1 microsecond, i.e., a 1 MHz bandwidth, again corresponding to a maximum differential speed compensation capability of 0.5 m/sec, at an optical wavelength of 0.5 micrometers.

The optionally amplified beam that illuminates the phase conjugator mirror 520 contains two Doppler-shifted components: (i) a coherent signal component, which arises from any global motion of the scattering medium; and (ii) an incoherent noise component, resulting from differential motion within the scattering medium, which can be the result of Brownian motion, as an example. As a result of the propagated optionally amplified beam striking the self-pumped phase-conjugate mirror 520, a wavefront reversed propagated beam is formed.

The wavefront-reversed propagated beam passes through the lens 400 and the scattering medium 300. The wavefront-reversed propagated beam is re-directed by the beam splitter 200 toward the heterodyne detector 600 and as beam 105. The wavefront-reversed replica of the propagated beam 30 is not given a separate identifying number in FIGS. 1a, 1b, 2a, 2b, 3a, 3b, or 4, but its presence is signified by the fact that the arrows representing the propagated beams 30 are shown as indicating the laser light of those beams is moving in two directions namely toward lens 400 and then back towards the scattering medium 300 after having been formed into a wavefront-reversed replica of the propagated probe beams traveling towards lens 400. The wavefront reversed propagated beam will pick up global phase shift from the moving ensemble, thereby doubling the net detected phase shift, or global Doppler shift. On the other hand, the differential Doppler shift will be compensated during this return propagation path, due to the fact that the wavefront-reversed propagated beam retraces its incident path, undoing path distortions as wall as differential velocity motion(s).

Figure 1B:
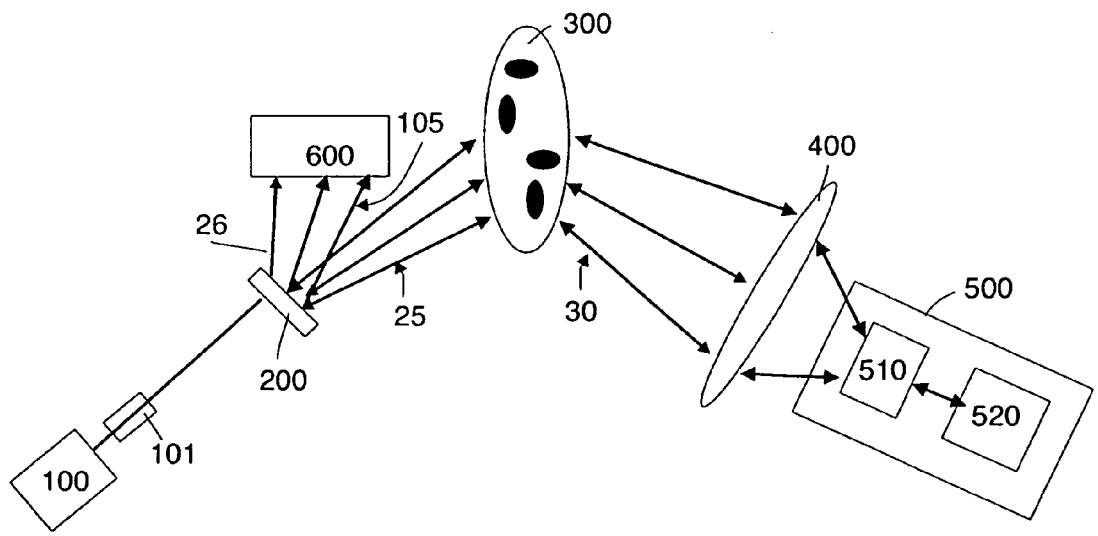
FIG. 1b is a schematic of the basic system components of another embodiment: a laser probe, the scattering medium, wavefront-reversal module (a self-pumped phase-conjugate mirror), and a homodyne detector/processor.
Figure 2A:
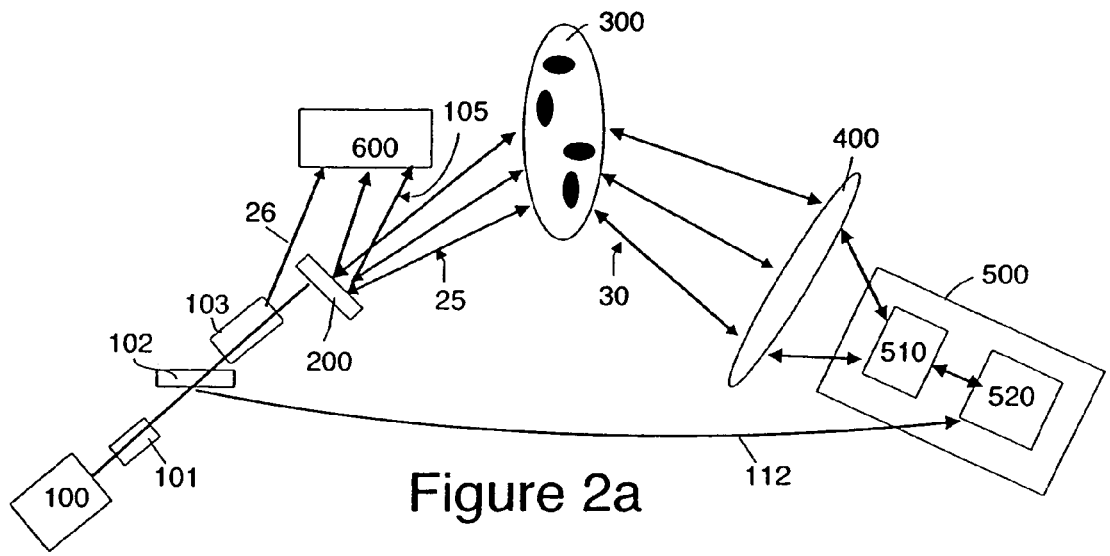
FIG. 2a is a schematic of the basic system components of another embodiment: a laser probe, the scattering medium, wavefront-reversal module (an externally-pumped phase-conjugate mirror), and a heterodyne detector/processor.
Figure 2B:
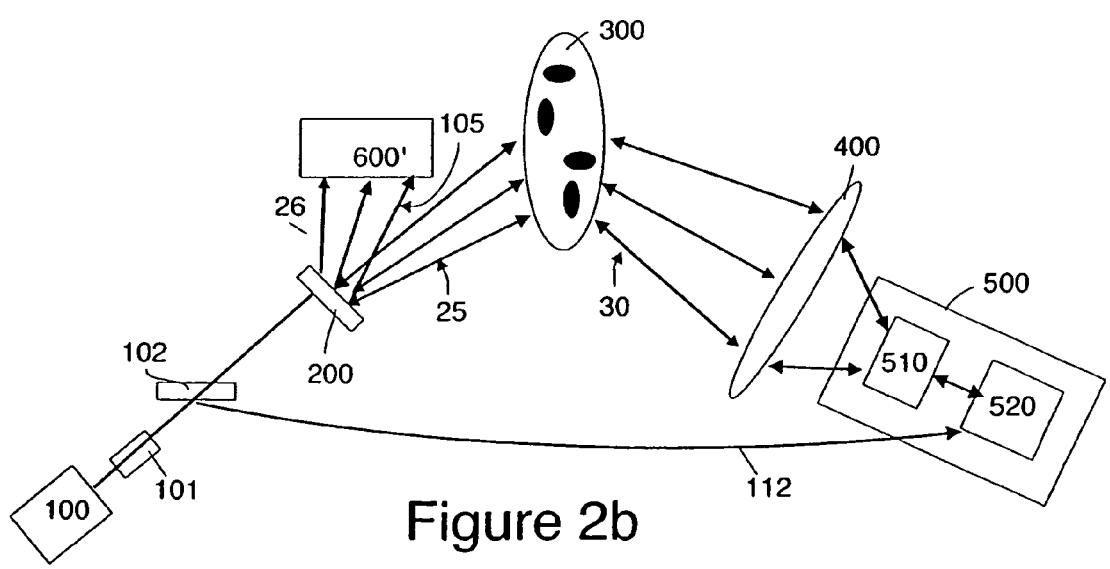
FIG. 2b is a schematic of the basic system components of yet another embodiment: a laser probe, the scattering medium, wavefront-reversal module (an externally-pumped phase-conjugate mirror), and a homodyne detector/processor.

In another embodiment a homodyne receiver, as shown in FIGS. 1b and 2b, is utilized. Most of the elements of this embodiments are the same as in the embodiments of FIGS. 1a and 2a and therefore are not described in further detail here. Rather this description will focus on the elements which differ from the embodiment of FIGS. 1a and/or 2a. Detectors 600 and 600' are both examples of coherent detectors. The homodyne detector 600' requires two incident beams, as does the heterodyne detector: the signal beam 105 and the local oscillator beam 26. The difference, however, is that the local oscillator of the heterodyne detector 600 is offset in frequency relative to the signal beam (in the example set forth in the embodiment of FIG. 1a, the offset is in the range of 10–80 MHz). By contrast, the LO of homodyne detector 600' is not offset in frequency and therefore it possesses the same nominal frequency as does the signal beam. Therefore, the Acousto Optic modulator 103 in FIG. 1a, for example, is not required. The relative benefits and tradeoffs among these two coherent detector systems are well-known in the art. Simply stated, the homodyne system possesses a 3 dB advantage in signal-to-noise relative to the heterodyne system, but, requires a phase-tacking system to maintain quadrature operation, (i.e., a 90 degrees phase shift) between the signal and LO, which adds additional complexity to the homodyne detector 600'.

Another embodiment of this technology involves the use of an externally pumped phase-conjugate mirror 520' in FIGS. 2a and 2b. The externally pumped phase-conjugate mirror 520' replaces the self-pumped phase-conjugate mirror 520 in the embodiments of FIGS. 1a and 1b, therefore this description will focus on the elements that differ from the embodiments utilizing the externally pumped phase-conjugate mirror 520. The externally pumped phase-conjugate mirror 520', which is also known as a "kitty" conjugator, involves a photorefractive crystal with a pair of coherent input beams: a "pump" beam and a "probe" beam that are mutually coherent. The pump beam is the more powerful beam. In the presence of the pump beam, the weaker probe beam will "reflect" from the photorefractive crystal as a phase conjugate replica. The "kitty" conjugator allows the disclosed apparatus to function over a wide field of view (that is the diffused beam 30 can occur over a greater range of angles relative to the photorefractive crystal compared to the embodiment of FIGS. 1a and 1b). The "kitty" conjugator also enables one to realize a faster responding PCM compared to the PCM of FIGS. 1a and 1b. Also, the "kitty" conjugator can have an amplifying effect so that more light occurs in the wavefront reversed light emanating from the photorefractive crystal than occurred in the probe light 30 which impinged upon the photorefractive crystal in the first place. The additional energy is derived from the pump beam 112.

In FIGS. 2a and 2b, the pump beam is labeled by reference number 112 while the probe beam is labeled with reference numeral 25. The light reflecting from or passing through the scattering medium 300 is labeled by reference number 30. A laser beam from the probe laser 100 passes through a beam splitter 102 creating the pump beam 112 and the probe beam 25. The pump beam 112 is directed toward the externally pumped phase-conjugate mirror 520'. The probe beam 25 propagates through via AO modulator 103 (in the case of the embodiment of FIG. 2a) to the scattering medium 300 and then is identified as the propagated probe beam 30. The externally pumped phase-conjugate mirror 520' operates in the same general manner as the self-pumped phase-conjugate mirror in that it reflects a wavefront-reversed replica of the propagated probe beam 30 so that the wavefront-reversed replica of the propagated probe beam 30 will converge on the scattering medium 300 in the same locations, or spots, drawn where the probe beam 25 impinges same, reflecting along the beam path taken by beam 25 until beam splitter 200 redirects the wavefront-reversed replica of the propagated beam towards the detector, shown as a heterodyne detector 600 in the embodiment of FIG. 2a and homodyne detector 600' in the embodiment of FIG. 2b. An externally pumped phase-conjugate mirror 520' compensates for both the incoherent as well as the coherent components of the spectrum. In order for the eternally pumped device to yield the desired results, it is preferred that the incoherent component is within the compensation bandwidth of the device and that the coherent component is outside the bandwidth of the device.

Figure 3A:
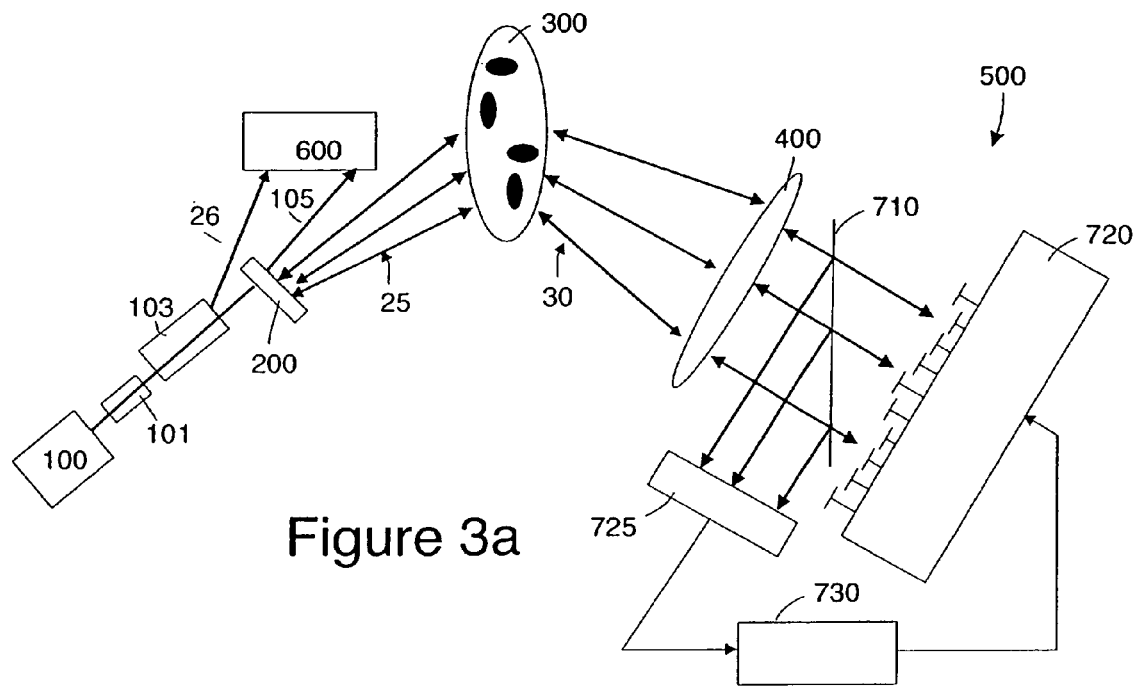
FIG. 3a is a schematic of the basic system components of the another embodiment: a laser probe, the scattering medium, wavefront-reversal module (a spatial light modulator), and a heterodyne detector/processor.
Figure 3B:
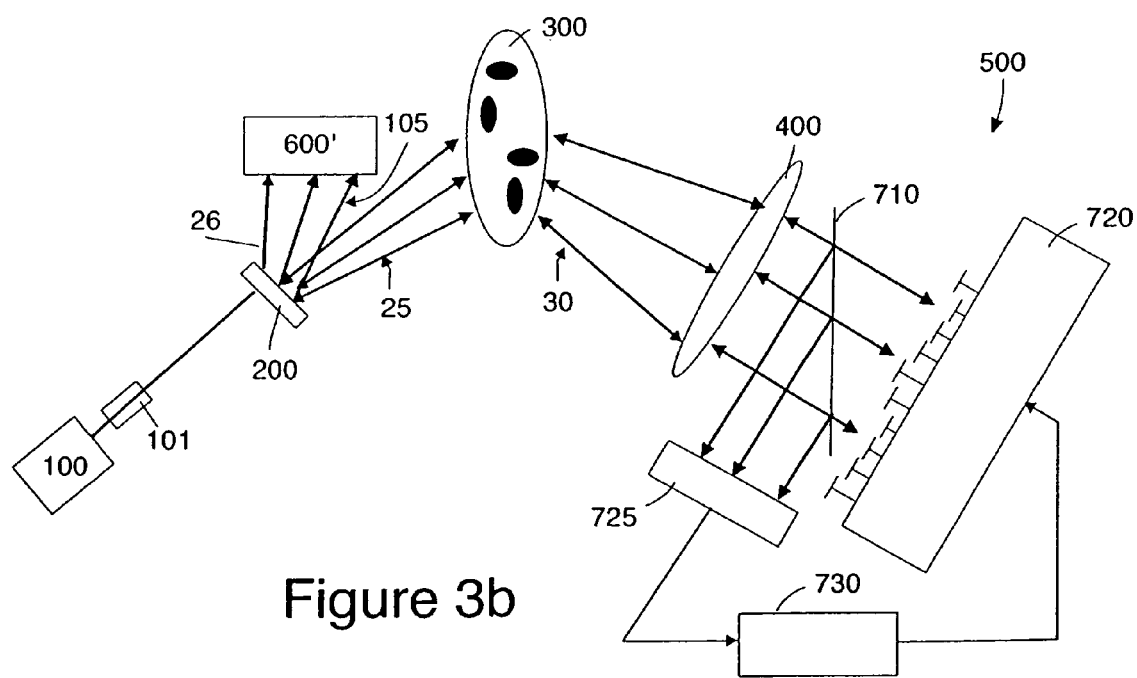
FIG. 3b is a schematic of the basic system components of the another embodiment: a laser probe, the scattering medium, wavefront-reversal module (a spatial light modulator), and a homodyne detector/processor.

Another embodiment utilizes a Spatial Light Modulator (SLM) 700 in the wavefront-reversal system 500 as shown in FIGS. 3a and 3b. These two embodiments are very similar to the embodiments of FIGS. 1a and 1b, respectively, except that a SLM 700 and several supporting elements are used in the wavefront-reversal system 500 and in these embodiments the light emanating from optical element 400 has parallel beams in a direction towards the wavefront-reversal system 500.

In these two embodiments the wavefront-reversal system 500 includes an number of elements 710–730. Beam splitter 710 directs the incident beam to a Wavefront-Error Sensor (WES) detector subsystem 725. The WES detector subsystem 725 that may be implemented by a Shack-Hartman array of quad detectors. The electrical output of the WES detector subsystem 725 is processed by a processor 730, whose output drives a phase-only Spatial Light Modualtor (SLM) 720. Examples of SLMs 720 include deformable mirrors (driven by arrays of piezoelectric transducers), optical MEMS reflective piston arrays (a piston array is shown in a representative fashion in FIGS. 3a and 3b), or liquid crystal SLMs that encode an incident optical beam with phase-only (wavefront) information. The incident beam from lens 400, which is directed to the SLM 720 will, after convergence of the closed-loop processor 730, emerge as a wavefront-reversed replica of the incident beam. This wavefront-reversed replica will retrace the path of the incident beam, pass back through optical element 400, and retrace the path back to the scattering region 300, and continue back to the element 200, and into the coherent detector/processor 600, similar to the evolution of the beam from the phase conjugate mirror in the embodiment of the wavefront-reversal system 500 of FIGS. 1a, 1b, 2a and 2b.

Figure 4:
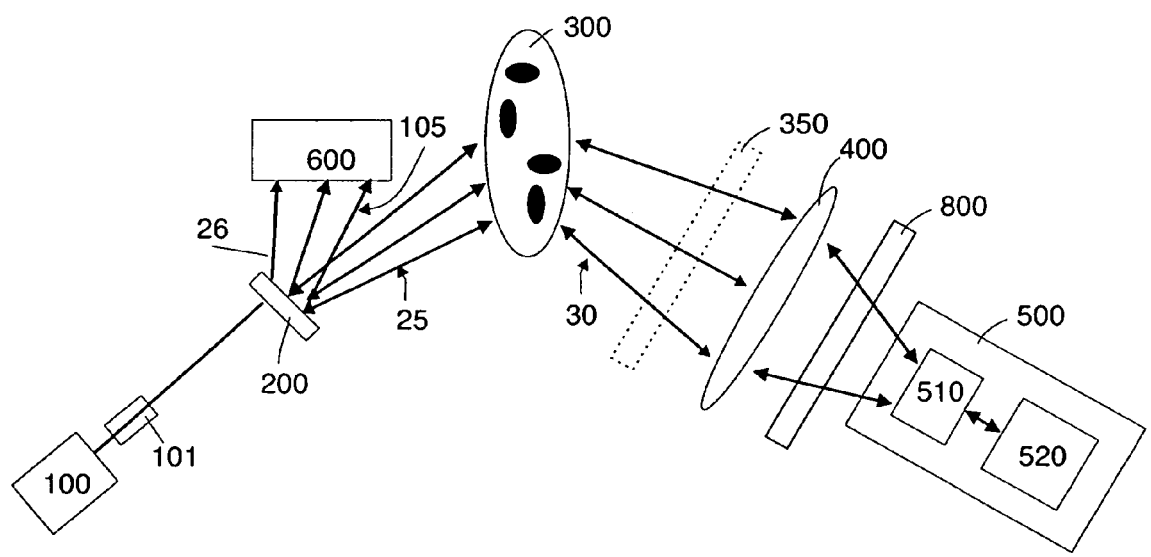
FIG. 4 is a block diagram of another embodiment where a spatial domain enhancement scheme of a mode homogenizer is added.

A spatial domain enhancement system may be added to the disclosed embodiments. An example of an embodiment with a spatial domain enhancement system, such as a mode homogenizer 800, is depicted by FIG. 4. FIG. 4 is basically identical to FIG. 1b except for (I) the addition of mode homogenizer 800 between optical element 400 and the wavefront-reversal system 500 and that the fact that the previously discussed optional amplifier is shown in dashed lines 350.

Figure 4A:
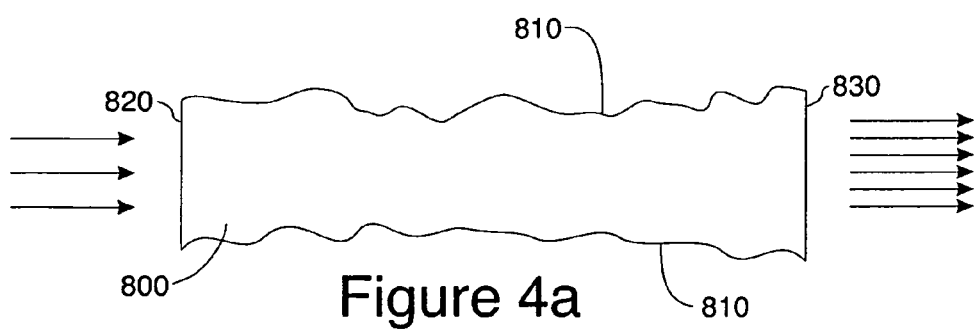
FIG. 4a is a drawing of a long, mutimode optical fiber with intentional imperfection on the outside wall thereof.

A mode-homogenizer 800 takes a highly structured incident beam (e.g. a complex spatial pattern of high-contrast bright and dark patches) with arbitrary "fill factor", and, via passive techniques, provides an output beam with a more uniform spatial structure. One embodiment of a mode homogenizer 800 is a highly multimode optical fiber (see FIG. 4a) with many mode-mixing perturbations 810 (such as microbends, tapers, internal defects, sidewall defects; a design consideration being the necessity to map an incident beam into as many modes as reasonably possible, while creating as little differential modal perturbation as reassonably possible). During operation, a highly structured intensity pattern at the input 820 to the homogenizer 800 (e.g. a few spatial modes) will emerge from the homogenizer (waveguide) 800 at output 830 with many spatial modes excited. Thus, the wavefront-reversal system 500 will "see" a beam with a smoother intensity profile over its field-of-view and result in a more homogenized wavefront reversed replica, thereby enhancing the system performance. Since the mode homogenization process is a reciprocal process, it is accomplished in a passive and reciprocal manner and, moreover, designed so that all photon transit-time differences through the device are much less than the inverse of the maximum bandwidth to be processed (e.g. the maximum transit-time difference is typically far less than a nsec, while the maximum bandwidth is expected to be less than a MHz), then, the mode homogenizer will not systematically affect or degrade the temporal performance of the system. Therefore, the ability of the system to extract the desired temporal features of the beam (the coherent component, while exorcising the incoherent component) will be optimized.

The mode homogenizer 800 can be used with any of the embodiments of the wavefront-reversal system 500 described herein and with either a heterodyne detector 600 or homodyne detector 600'.

In order to obtain highly optimized performance, no new gratings should be created during the measurement process, otherwise, new random noise terms can result in arbitrary phase shifts, thereby corrupting the sensor. There are two potential sources for such detrimental phase-noise affects to occur. The first is fundamental to stimulated scattering processes, while the second is related to the scattering medium under examination. Regarding the former, it should be noted that, in general, a global, yet fixed, phase shift is typically imposed onto wavefront-reversed replicas created by the phase-conjugate mirror, which is fundamental to, and generated by, the stimulated scattering process itself. Being a fixed phase factor in time, however, this overall constant phase value is of no consequence, so long as it remains fixed throughout the sensor measurement (which, in most cases is precisely what occurs).

Regarding the latter phase-noise effect, it should be noted that it is possible for new gratings to be formed during the measurement if the input beams vary appreciable during this time. This can occur if, during the two-pass photon transit time to and from the wavefront-reversal system 500 back to the scattering ensemble, the scattering sites move appreciably (relative to the spatial resolving limit of the system, which is wavelength and particle size dependent). In many applications, however, this situation is not expected to occur, since the f/# (f-number) for most scenarios is rather large and the particle speeds are relatively small and the photon round trip time (for typical ranges) is relatively fast compared to the time scales in the system. Therefore, it is anticipated that, for most scenarios, the beams incident upon the wavefront-reversal system 500 do not vary appreciably, in a spatial sense. In this case, only the overall phase of the wavefront entering the wavefront-reversal system 500 changes during the measurement process, whose displacement is to be sensed, and not the shape of the wavefront.

Other issues that affect the sensing system are the ensemble's spatial "fill factor", which manifests itself in terms of residual phase noise, and the spatial resolution of the optical system.

Having described this technology in connection with a number of embodiments, modification will now certainly suggest itself to those skilled in the art. As such, the appended claims are not to be limited to the disclosed embodiments except as specifically required by the appended claims.

What is claimed is:

1. An optical system for sensing net global motion components in a scattering medium, the optical system comprising:

(a) a laser probe source for producing a beam to illuminate said scattering medium;

(b) a wavefront-reversal device for collecting light propagated through said scattering medium and returning a conjugated beam; and (c) an optical detector for detecting and processing said conjugated beam.

2. A system of claim 1 further comprising an amplifier for amplifying said beam after it propagates through said scattering medium before it enters said wavefront-reversal device.

3. A system of claim 2 where said wavefront-reversal device wherein said wavefront-reversal device is selected from the group consisting of a spatial light modulator, a self-pumped phase conjugated mirror and an externally pumped phase conjugated mirror.

4. A system of claim 3 further comprising a spatial domain enhancement apparatus disposed between the scattering medium and the wavefront-reversal device for imposing a more uniform spatial structure on the light which propagates through said scattering medium towards the wavefront-reversal device.

5. A system of claim 1 wherein said wavefront-reversal device is selected from the group consisting of a spatial light modulator, a self-pumped phase conjugated mirror and an externally pumped phase conjugated mirror.

6. A system of claim 5 further comprising a spatial domain enhancement apparatus disposed between the scattering medium and the wavefront-reversal device for imposing a more uniform spatial structure on the light which propagates through said scattering medium towards the wavefront-reversal device.

7. A system of claim 1 where said optical detector is a coherent detector.

8. A system of claim 7 where said coherent detector is a heterodyne detector.

9. A system of claim 7 where said coherent detector is a homodyne detector.

10. An optical system for suppressing noise components produced by a scattering medium, the optical system comprising:

(a) a laser probe source for producing a beam to illuminate said scattering medium;

(b) a phase-conjugate mirror for collecting light propagated through said scattering medium and returning a conjugated beam; and (c) a coherent optical detector for detecting and processing said conjugated beam propagated through said scattering medium.

11. The optical system for suppressing noise components of claim 10 wherein the phase-conjugate mirror is self-pumped.

12. The optical system for suppressing noise components of claim 10 wherein the phase-conjugate mirror is externally pumped.

13. The optical system for suppressing noise components of claim 10 further comprising a spatial domain enhancement apparatus disposed between the scattering medium and the phase-conjugate mirror for imposing a more uniform spatial structure on the light which propagates through said scattering medium towards the phase-conjugate mirror.

14. A remote sensor comprising:

(a) a laser probe source for generating a beam to illuminate said scattering medium;

(b) a wavefront-reversal device for collecting light propagated through said scattering medium and returning a conjugated beam; and (c) an optical detector for detecting and processing said conjugated beam reflected from said scattering medium.

15. A system of claim 14 further comprising an amplifier for amplifying said beam after it propagates through said scattering medium before it enters said wavefront-reversal device.

16. A system of claim 15 where said wavefront-reversal device wherein said wavefront-reversal device is selected from the group consisting of a spatial light modulator, a self-pumped phase conjugated mirror and an externally pumped phase conjugated mirror.

17. A system of claim 16 further comprising a spatial domain enhancement apparatus disposed between the scattering medium and the wavefront-reversal device for imposing a more uniform spatial structure on the light which propagates through said scattering medium towards the wavefront-reversal device.

18. A system of claim 14 wherein said wavefront-reversal device is selected from the group consisting of a spatial light modulator, a self-pumped phase conjugated mirror and an externally pumped phase conjugated mirror.

19. A system of claim 18 further comprising a spatial domain enhancement apparatus disposed between the scattering medium and the wavefront-reversal device for imposing a more uniform spatial structure on the light which propagates through said scattering medium towards the wavefront-reversal device.

20. A system of claim 14 where said optical detector is a coherent detector.

21. A system of claim 20 where said coherent detector is a heterodyne detector.

22. A system of claim 20 where said coherent detector is a homodyne detector.

23. A method for sensing net global motion components in an ensemble of dynamically moving scattering sites, the method comprising the steps of:
(a) generating a output beam with a wavefront;
(b) passing said output beam through a scattering medium;
(c) forming a return beam with a wavefront from said output beam;
(d) wavefront matching said wavefront of the return beam to said wavefront of the output beam;
(e) passing said return beam through said scattering medium; and
(f) extracting desired motion component from said return beam.

24. A method for suppressing noise components produced by an ensemble of dynamically moving scattering sites, the method comprising the steps of:
(a) generating a probe beam;
(b) propagating said probe beam through said scattering medium;
(c) collecting light, via a wavefront-reversal device, propagated through said scattering medium and returning a conjugated beam;
(d) detecting said conjugated beam reflected from said scattering medium; and
(e) extracting desired motion component from said return beam.

* * * * *